United States Patent
Miller

(10) Patent No.: US 6,417,593 B1
(45) Date of Patent: *Jul. 9, 2002

(54) COMPOSITE ELECTRICAL INSULATION WITH CONTACTING LAYER AND METHOD OF MAKING THE SAME

(75) Inventor: Mark Lee Miller, Oviedo, FL (US)

(73) Assignee: Siemens Westinghouse Power Corporation, Orlando, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,292

(22) Filed: Jan. 7, 1999

(51) Int. Cl.[7] .............................. H02K 1/00; H02K 3/34
(52) U.S. Cl. ........................ 310/195; 310/196; 310/215
(58) Field of Search .................... 442/295; 174/124, 174/124 R, 122 G, 122 R; 428/121, 272; 310/195, 196, 201, 208, 215, 213, 214, 121 R, 42, 43; 336/115, 117, 118, 205, 206, 207; 29/598, 605, 606

(56) References Cited

U.S. PATENT DOCUMENTS

| | | | |
|---|---|---|---|
| 1,784,989 A | * 12/1930 | Hill | 310/196 |
| 3,629,024 A | 12/1971 | Kimura et al. | |
| 3,723,797 A | * 3/1973 | Andersson et al. | 310/196 |
| 3,919,348 A | * 11/1975 | Foster et al. | 260/837 |
| 4,046,938 A | 9/1977 | Torossian et al. | |
| 4,332,836 A | 6/1982 | Urban | |
| 4,345,175 A | * 8/1982 | Jones | 310/45 |
| 4,389,587 A | * 6/1983 | Levine et al. | 310/208 |
| 4,400,676 A | 8/1983 | Mitsui | |
| 4,739,202 A | * 4/1988 | Hatanaka | 310/52 |
| 4,836,769 A | * 6/1989 | Iwabuchi et al. | 428/377 |
| 4,886,699 A | 12/1989 | Carroll et al. | |
| 4,983,247 A | 1/1991 | Kim | |
| 5,075,159 A | * 12/1991 | Koyama et al. | 428/222 |
| 5,284,702 A | * 2/1994 | Umemoto et al. | 428/272 |
| 5,300,844 A | * 4/1994 | Schuler | 310/215 |
| 5,356,691 A | 10/1994 | Yamamoto et al. | |
| 5,468,915 A | * 11/1995 | Green | 174/124 |
| 5,534,337 A | 7/1996 | Bailey, Jr. | |
| 5,736,254 A | 4/1998 | Suzuki et al. | |
| 5,763,978 A | * 6/1998 | Uchida et al. | 310/215 |
| 5,948,505 A | * 9/1999 | Puppin | 428/121 |
| 6,140,733 A | * 10/2000 | Wedde et al. | 310/196 |

* cited by examiner

Primary Examiner—Nestor Ramirez
Assistant Examiner—Dang Dinh Le

(57) ABSTRACT

An insulating material (10) for an electrical generator rotor and method of forming the same. An insulating substrate (12) is formed from a single layer of woven glass fabric (16) having a necessary thickness and coated with a thermosetting resin (18). A first side of the substrate (12) is adhered to a first layer of copper winding material (20) of an electrical generator. A second side of the substrate (12) is covered with a layer of contacting material (14), such as plastic film, paper, treated felt or coated glass fabric, to cover the rough as-formed surface of the substrate (12) resulting from the coating of the necessarily thick layer of fabric (16). The contacting material (14) provides a desired coefficient of friction to form a slip surface permitting relative movement between the first layer of copper winding material (20) and a second layer of copper winding material (24) disposed over the insulating material (10). The addition of a separate contacting layer eliminates the prior art step of laminating three relatively thin layers of prepreg composite material to achieve a desired thickness and surface finish. Sanding to maintain adequate thickness control is also eliminated, thereby significantly reducing the cost of the insulating material (10) when compared to prior art insulation.

14 Claims, 1 Drawing Sheet

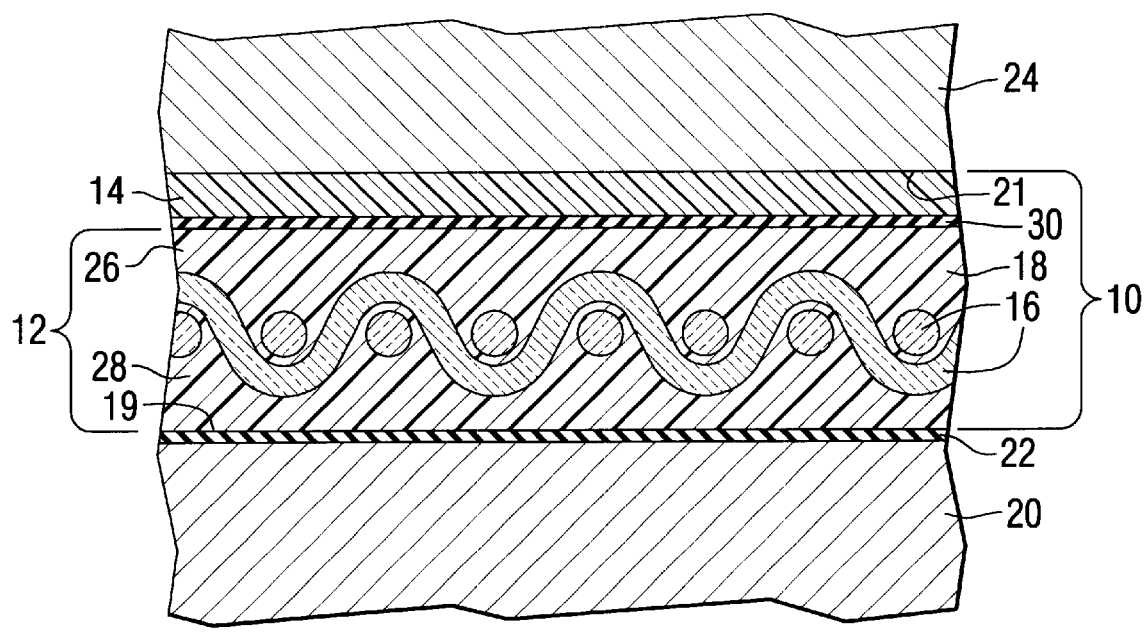

COMPOSITE ELECTRICAL INSULATION WITH CONTACTING LAYER AND METHOD OF MAKING THE SAME

FIELD OF THE INVENTION

This invention relates generally to the field of electrical insulation. The invention relates more particularly to the field of composite electrical insulation for use between the layers of copper that form the windings of an electrical generator rotor.

BACKGROUND OF THE INVENTION

Electrical power generators are known in the art to contain rotor windings that are constructed of layers of copper rotor conductors. Multiple layers of copper are stacked radially in channels formed on the generator rotor. Layers of insulating material are installed between the individual layers of copper to provide both electrical insulation and a slip surface for accommodating differential movement between adjacent copper winding layers. The stack of copper and insulating layers is pre-loaded and mechanically constrained by a wedge device to minimize the movement of the layers and to restrain the stack as it undergoes centrifugal and electromagnetic forces during the operation of the generator.

A prior art insulating material for this application is a step-laminated epoxy glass NEMA grade G-11 composite material formed from multiple layers of prepreg that are pressed together under high pressure and temperature to form a roll format laminated material. This material is known to provide adequate compression creep resistance during centrifugal force loading and a surface that does not cause abrasion of the adjacent copper layer during turning gear operation. However, in order to achieve the required tolerance for overall thickness of this prior art laminated material, it is necessary to sand one side surface of the material before its use in an electrical generator. Sanding provides the required thickness control while the unsanded side provides an acceptable coefficient of friction for contact with the adjacent copper layer. The sanded side of the material is then coated with adhesive and affixed to a first layer of copper while the unsanded side is allowed to slip against the adjoining layer of copper. Step laminating has slow process cycle times, and the sanding step adds further time and expense to the manufacturing process, thus making the prior art step-laminated epoxy glass composite product expensive. Further, the step laminating process requires expensive tooling, thereby limiting the number of suppliers willing to invest in the required production facilities.

SUMMARY

Accordingly, it is an object of this invention to provide an electrical insulating material for insulating between the layers of copper windings of an electrical generator that provides performance characteristics similar to prior art insulating material but that is less expensive to manufacture than prior art insulating material. Further, it is an object of this invention to provide a method for manufacturing an electrical insulating material for insulating between the layers of copper windings of an electrical generator that uses standard, inexpensive processing equipment.

In order to achieve these and other objects of this invention, an insulating material according to one aspect of this invention includes an electrically insulating substrate and a contacting layer disposed on the substrate; wherein the contacting layer provides a surface having a predetermined coefficient of friction. A method of manufacturing an insulating material according to another aspect of this invention includes the steps of providing an electrically insulating substrate, and disposing a contacting layer having a predetermined coefficient of friction on the substrate.

BRIEF DESCRIPTION OF THE DRAWINGS

FIG. 1 illustrates a cross-sectional view of composite insulating material in accordance with this invention installed between adjacent windings of an electrical generator rotor.

DESCRIPTION OF THE PREFERRED EMBODIMENTS

An electrical insulating material for use in the windings of an electrical generator should be formed in roll format and should have the electrical insulating properties predetermined by the generator design. The insulating material should also exhibit a predetermined small amount of mechanical creep when subjected to the high compression forces created during the operation of the electrical generator. Creep in this context means a reduction in the thickness of the insulating material over time. A reduction in the thickness of the insulating material will cause a reduction in the pre-load applied to the winding stack, thereby allowing relative movement between the layers of the winding. Some movement between the layers is unavoidable and is, in fact, desirable to a limited extent to relieve thermal stresses. This limited movement is provided in some generator designs by allowing some slippage between the insulating layer and the adjoining copper winding. However, significant loosening of the stack due to excessive creep of the insulating material will result in fretting of the copper material. This is particularly a problem when the generator is rotated slowly on its turning gear, because during such periods of slow rotation there is no centrifugal force to help restrain the layers of the stack. Movement of the windings may cause fretting of the copper windings, thereby creating copper dust. It is known that such copper dust serves to reduce the dielectric properties of the insulating material, and it has been known to cause shorting failures in electrical generators.

An insulating material 10 according to this invention is illustrated in FIG. 1. The insulating material 10 includes an electrically insulating substrate layer 12 and a contacting layer 14. The substrate layer 12 may include a woven glass fabric 16 saturated with a thermosetting polymer resin 18. The contacting layer 14 is disposed on a surface of the substrate layer 12 and is chosen to be a material that will provide predetermined abrasion and friction properties. When used as an insulating material for an electrical generator, the bottom surface 19 of the insulating material 10 opposed to the contacting layer 14 is bonded to a first layer of copper winding material 20 by a bonding layer 22. The bonding layer may be a dry adhesive such as nitrile rubber. A second layer of copper winding material 24 is then placed over the insulating material 10 with no bonding therebetween. The contacting layer 14 acts as a slip surface with a predetermined coefficient of friction on its top surface 21 to provide for relative movement between the first and second layers of copper winding material 20,24. The desired coefficient of friction is the same as, or somewhat less than, that of the unsanded epoxy resin surface of the prior art material formed in a high pressure and temperature press.

The insulating material 10 can be manufactured by using common coating processes known in the art without the use of a high pressure and temperature press. The substrate 12 is formed by first selecting an industrial fiber glass fabric 16 which will provide the desired thickness and density as dictated by the insulation system design. It is preferable to select a high glass content fabric 16 in order to minimize the mechanical compression creep that will occur under the high centrifugal forces typically experienced in an electrical generator rotor. A plain weave with medium to high weight per unit area may be selected. Other fabric weaves may be selected such as five or eight harness satin weave. In one embodiment the fabric 16 used complies with specification ASTM-D-578, style 7781, as published by the American Society for Testing and Materials. This material is an eight harness (8H) satin weave and has a nominal thickness of 0.009 inches (0.229 mm).

The glass fabric 16 selected for the substrate 12 is saturated with a thermosetting polymer resin 18 and then cured. In order to minimize the susceptibility of the insulating material to creep, a high cross-linking thermosetting epoxy may be used as resin 18. Furthermore, to minimize creep, the thickness of the upper resin layer 26 located above the glass fabric 16 and that of the lower resin 28 layer located below the glass fabric 16 should be minimized. A predetermined upper limit for the thickness of these layers should be selected to ensure that the glass fabric 16 is entirely enveloped by the resin 18, while at the same time minimizing the thickness of non-reinforced resin upper and lower layers 26,28. For the embodiment discussed above with style 7781 fabric 16, an epoxy resin 18 may be applied with upper and lower resin layer thicknesses 26,28 of no more than 0.002 inches (0.50 mm) each, and preferably with thicknesses of no more than 0.001 inches (0.025 mm) each. The resin 18 may then be cured at a temperature of 280–350 degree F. (125–160 degrees C.) for approximately one-half to one hour.

A contacting layer 14 is then applied to the substrate layer 12. The contacting layer 14 may be applied to the substrate layer 12 before the step of curing the thermosetting resin 18, thereby bonding the contacting layer 14 directly to the substrate layer 12 by means of the upper resin layer 26. Alternatively, a layer of adhesive 30 may be applied to the bottom surface of the contacting layer 14 prior to it being applied to the substrate 12 after the substrate resin 18 has been cured. The adhesive 30 may be urethane rubber based product and it may be applied to a thickness of approximately 0.0005–0.0010 inches (0.013–0.025 mm). The contacting layer 14 with adhesive 30 is applied to the substrate layer 12 by nip rolling or other process known in the art, then cured at an appropriate temperature, for example 280–350 degrees F (125–160 degrees C.).

A contacting layer 14 material is incorporated as part of the insulating material 10 to provide the desired coefficient of friction and resistance to abrasion of the adjoining layer of copper winding material 24. The thickness of the substrate 12 depends only upon the thickness of the selected glass fabric 16 and the thickness of the applied upper and lower resin layers 26,28, and it is, therefore, easily controlled. Similarly, the thickness of the contacting layer 14 and layer of adhesive 30 is easily controlled. Therefore, sanding is not necessary to control the thickness of the insulating material 10 of this invention.

Unlike the surface of the prior art step-laminated composite material that is controlled to be relatively smooth by the surface of the press, the top surface of the substrate 12 as it exists after the curing step is too rough for use as generator winding insulation. Controlling the type and amount of resin 18, the type of substrate glass 16, and the curing process variables may control the properties of the as-cured substrate layer 12. The applicant has found that such controls are adequate for controlling the surface 19 of the substrate 12 that is bonded to the copper winding material 20. However, to obtain the desired surface properties for the surface of the insulating material which will abrade against the adjacent copper winding material 24, the applicant has found that it is necessary to use a contacting layer 14 to provide a coefficient of friction that is less than that of the substrate layer 12.

The coefficient of friction of the top surface 21 of the contacting layer 14 may be, by way of example, in the range of 0.2–0.25. The sliding properties of the contacting layer 14 may be selected to be similar to those of the unsanded top surface of thermosetting epoxy of the prior art insulating material. The material of the contacting layer 14 may be a plastic film, paper, treated felt, or coated glass fabric. In one embodiment the contacting layer 14 is aramid paper. In another embodiment the contacting layer 14 is a polyester material such as polyethylene naphthalate (PEN) with a nominal thickness of 0.001–0.002 inches (0.025–0.050 mm).

Other aspects, objects and advantages of this invention may be obtained by studying the Figure, the disclosure, and the appended claims.

I claim as my invention:

1. A method of manufacturing an insulating material for use in an electrical generator rotor, the method comprising the steps of:

coating a single layer of fabric material with a thermosetting polymer resin and curing the resin to form an insulating substrate layer having a top surface, a bottom surface and a predetermined thickness;

adhering a layer of contacting material to the top surface of the insulating substrate layer to form an insulating material top surface having a predetermined coefficient of friction;

disposing a first of layer of copper winding material in a channel of the electrical generator rotor;

adhering the bottom surface of the insulating substrate layer to the first layer of copper winding material; and disposing a second layer of copper winding material onto the insulating material top surface, the layer of contacting material providing for relative movement between the first and the second layers of copper winding material.

2. The method of claim 1, further comprising forming the insulating substrate layer to have an upper resin layer disposed above the single layer of fabric material and a lower resin layer disposed below the single layer of fabric material, each of the upper resin layer and the lower resin layer having a predetermined maximum thickness of no more than 0.002 inches.

3. The method of claim 1, further comprising forming the insulating substrate layer to have an upper resin layer disposed above the single layer of fabric material and a lower resin layer disposed below the single layer of fabric material, each of the upper resin layer and the lower resin layer having a predetermined maximum thickness of no more than 0.001 inches.

4. The method of claim 1, further comprising selecting the single layer of fabric material to be a glass fiber weave having a nominal thickness of 0.009 inches.

5. The method of claim 1, further comprising selecting the contacting material to be one of the group of plastic film, paper, treated felt and coated glass fabric.

6. The method of claim 1, further comprising selecting the contacting material to be one of the group of an aramid paper and a polyester material.

7. The method of claim 1, further comprising selecting the contacting material to be polyethylene naphthalate.

8. An insulating material arranged within an electrical generator rotor and disposed between first and second layers of copper winding material, the insulating material comprising:

an insulating substrate layer comprising a single layer of fabric material coated with a cured thermosetting polymer resin;

a layer of contacting material having a predetermined coefficient of friction adhered to a top surface of the insulating substrate layer;

a bonding material adhering a bottom surface of the insulating substrate layer to the first layer of copper winding material; and the layer of contacting material forming a slip surface to provide for relative movement between the first and the second layers of copper winding material within the electrical generator rotor.

9. The insulating material of claim 8, wherein the insulating substrate layer comprises an upper resin layer disposed above the single layer of fabric material and a lower resin layer disposed below the single layer of fabric material, each of the upper and lower resin layers having a predetermined maximum thickness of no more than 0.002 inches.

10. The insulating material of claim 8, wherein the insulating substrate layer comprises an upper resin layer disposed above the single layer of fabric material and a lower resin layer disposed below the single layer of fabric material, each of the upper and lower resin layers having a predetermined maximum thickness of no more than 0.001 inches.

11. The insulating material of claim 8, wherein the single layer of fabric material comprises a glass fiber weave having a nominal thickness of 0.009 inches.

12. The insulating material of claim 8 wherein the contacting material is one of the group of plastic film, paper, treated felt and coated glass fabric.

13. The insulating material of claim 8, wherein the contacting material is one of the group of aramid paper and a polyester material.

14. The insulating material of claim 8, wherein the contacting material comprises polyethylene naphthalate.

\* \* \* \* \*